INVENTOR.
ROBERT WEBER

June 25, 1968  R. WEBER  3,389,524
TWO HOLER SUPPORT

Filed March 5, 1965  3 Sheets-Sheet 2

INVENTOR.
ROBERT WEBER
BY
ATTORNEY

United States Patent Office 3,389,524
Patented June 25, 1968

3,389,524
TWO HOLER SUPPORT
Robert Weber, 38 Skipper Drive, West Islip, N.Y. 11795
Filed Mar. 5, 1965, Ser. No. 437,525
8 Claims. (Cl. 52—713)

ABSTRACT OF THE DISCLOSURE

A nail or threaded member having two apertures extending transverse to its longitudinal axis. A member, having a pair of leg portions, is secured to the nail with leg portions extending through the apertures. The leg portions are spring biased to frictionally lock the member against longitudinally and lateral movement.

---

The present invention relates to a novel means for securing a suspension wire to a nail, shaft, bolt, rod or the like.

In one embodiment, the present invention comprises a nail having two apertures extending transverse to its longitudinal axis. The pointed end of the nail is adapted to be fired into a concrete ceiling. A suspension wire is secured to the nail by extending and bending an end portion thereof through the apertures in the nail. The shape of the bent end portion together with its inherent resiliency locks the suspension wire in place. The suspension wire is capable of being secured with a minimum of strain placed on the nail.

An object of the present invention is to provide a novel means for securing a suspension wire to a nail, shaft, bolt, rod or the like with a minimum of strain placed on the nail.

Another object of the present invention is to provide a novel support comprising a rod or rod-like support member having a pair of apertures extending therethrough to provide means for securing a suspension wire thereto.

Another object of the present invention is to provide a support, as described in the preceding paragraph, wherein the step of extending the suspension wire through the apertures and locking it in place is easily and quickly facilitated and requires only one bending operation thereby minimizing the strain placed on the nail.

Another object of the present invention is to provide a support, as described in the preceding paragraph, wherein the suspension wire is adapted to be extended through the apertures so as to lock the suspension wire against lateral as well as longitudinal movement.

Another object of the present invention is to provide a nail having a pair of apertures extending therethrough to provide means for securing a suspension wire thereto.

Another object of the present invention is to provide a shaft having a threaded end portion for securing the shaft to a primary support and further including a pair of apertures extending therethrough to provide means for securing a suspension wire thereto.

Another object of the present invention is to provide a toggle bolt having a pair of apertures extending therethrough to provide means for securing a suspension wire thereto.

These and other objects and features of the invention are pointed out in the following description in terms of the embodiments thereof which are illustrated in the accompanying drawings. It is to be understood that these drawings are for the purpose of illustration only and are not to be construed as defining the limits of the invention, reference being had to the appended claims for this purpose.

Figure 4:
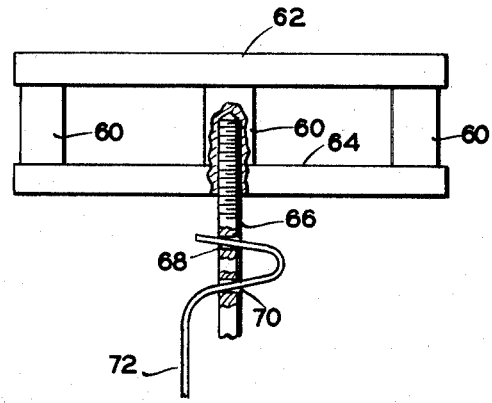
Figure 5:
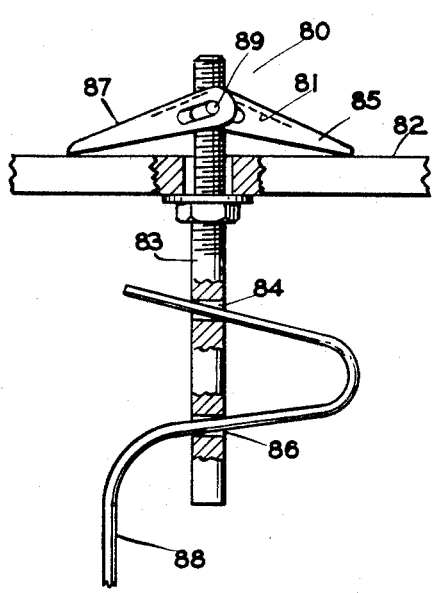
Figure 6:
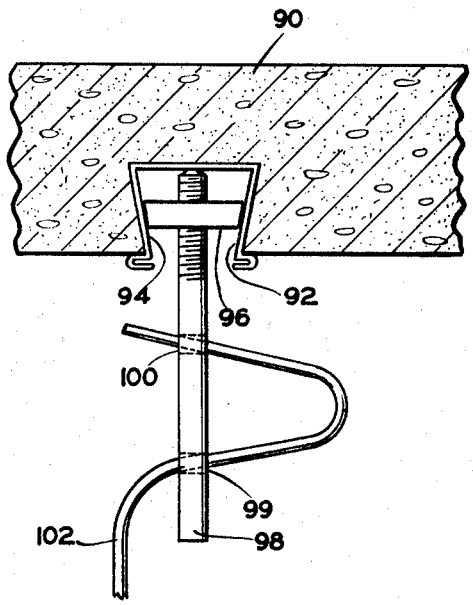

FIGURES 4–6, respectively, show a wood screw, toggle bolt and threaded shaft modified to support a suspension wire in accordance with the present invention.

Figure 1:
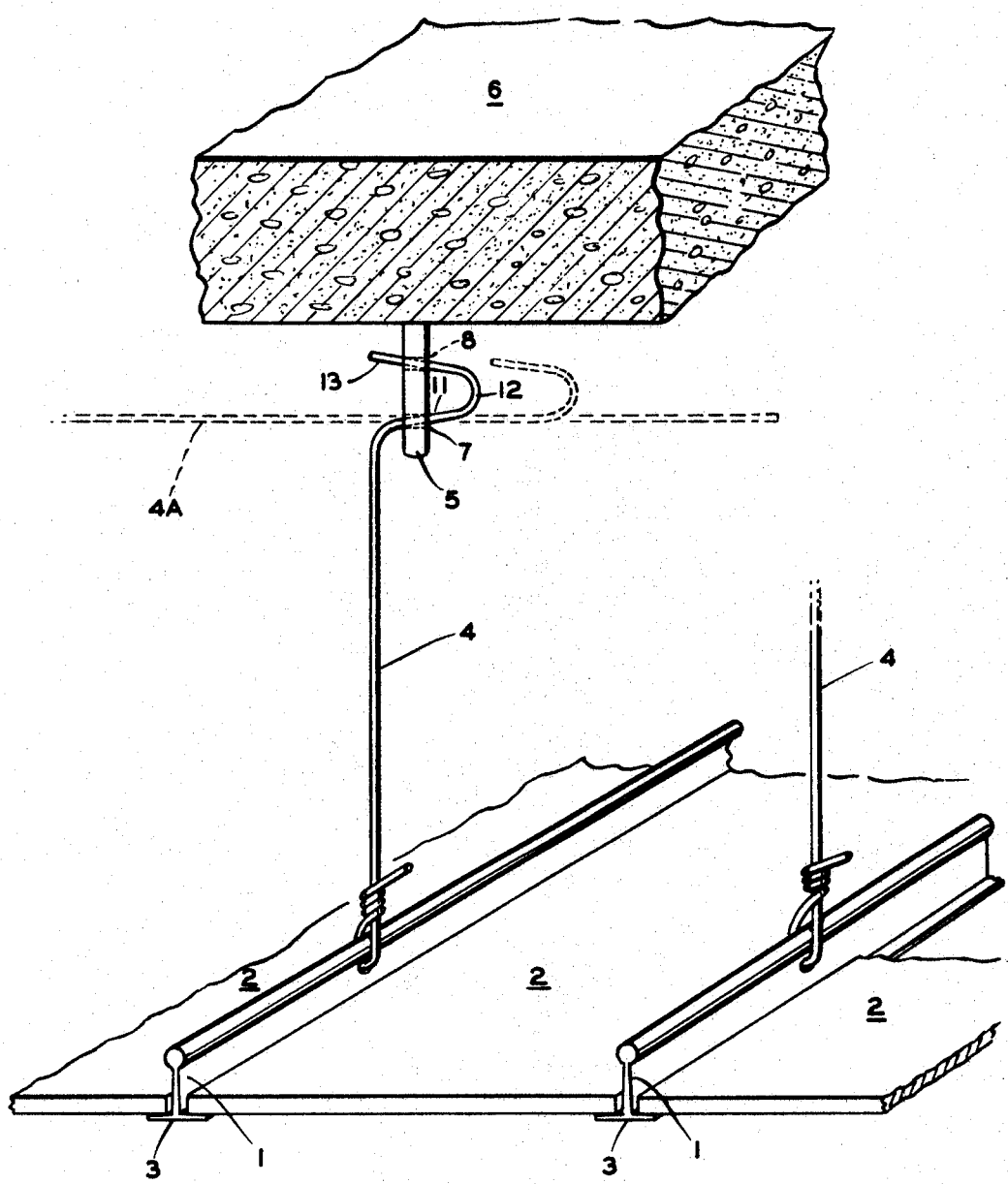
FIGURE 1 is a perspective view of a conventional ceiling construction using the novel suspension wire support means of the present invention.

Referring to FIGURE 1, a ceiling construction is illustrated comprising parallel, generally T-shaped runner members. Panels 2, forming the ceiling structure, are disposed between the T-shaped runner members 1 and rest on flanges 3 of the runners 1. It is to be understood that the structure of panels 2 and the method in which they are secured to runners 1 may take many forms as are well known in the art. The number of runners employed and their relative positions will depend upon the structural support required for a particular design and is a matter within the skill of the art.

Runners 1 are supported by suspension wires 4 which depend from and are secured to a nail 5 embedded in concrete ceiling 6. The suspension wire is of the conventional type used in suspending ceilings and may comprise, e.g. 8–12 gauge aluminum alloy wire. Nail 5 has two apertures 7 and 8 extending therethrough transverse to its longitudinal axis. Apertures 7 and 8, while shown perpendicular to the longitudinal axis of nail 5, may be disposed at a small angle to the longitudinal axis of nail 5.

The suspension wire 4 has a downwardly depending main portion and an upper end portion. The upper end portion comprises legs 11 and 13 extending through apertures 7 and 8, respectively. Legs 11 and 13 are connected by a bight portion 12.

As shown in broken lines at 4a the suspension wire comprises a straight piece of wire before it is secured to nail 5. An end portion of the suspension wire 4 is extended through aperture 7 and then reversely bent back to form the end portion having diverging leg portions 11 and 13. The legs 11 and 13 of the end portion are then compressed slightly and the wire is moved laterally so as to extend leg portion 13 through aperture 8 thereby locking the suspension wire in place. After the suspension wire 4 is locked in place, it is bent downwardly thereby making it ready for attachment of runners 1 therefrom.

The attachment of suspension wire 4 to nail 5 is accomplished with a minimum of strain placed on the nail. This is particularly significant as conventional methods of securing a suspension wire through a single aperture nail involve wrapping the wire about itself several times. This often results in loosening the nail thereby necessitating the costly step of firing a second nail into the concrete ceiling.

Figure 2:
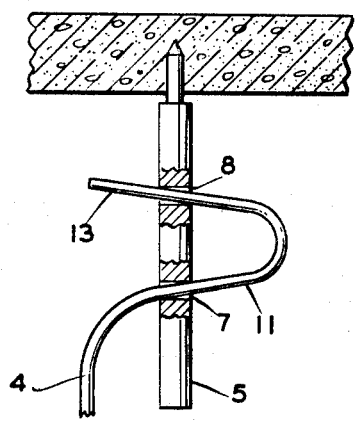
FIGURE 2 is an enlarged fragmentary view showing a suspension wire secured to a support nail in accordance with the present invention.

Referring to FIGURE 2, it can be seen that the suspension wire 4 is firmly locked to nail 5. The inherent resiliency of the suspension wire 4 spring biases the upper surface of leg 13 against the upper surface of aperture 8 and similarly, the lower surface of leg 11 is spring biased against the lower surface of aperture 7. As a result, the suspension wire is locked against lateral as well as longitudinal movement. In addition, the outwardly divergent relationship between legs 11 and 13 functions to limit lateral movement.

In order to minimize the danger of loosening the nail embedded in the concrete ceiling, it is common in the art to first attach the suspension wire to a coupling member and then attach the coupling member onto the end of the nail embedded in the concrete ceiling. A similar modification incorporating the present invention is shown in FIGURE 3.

Figure 3:
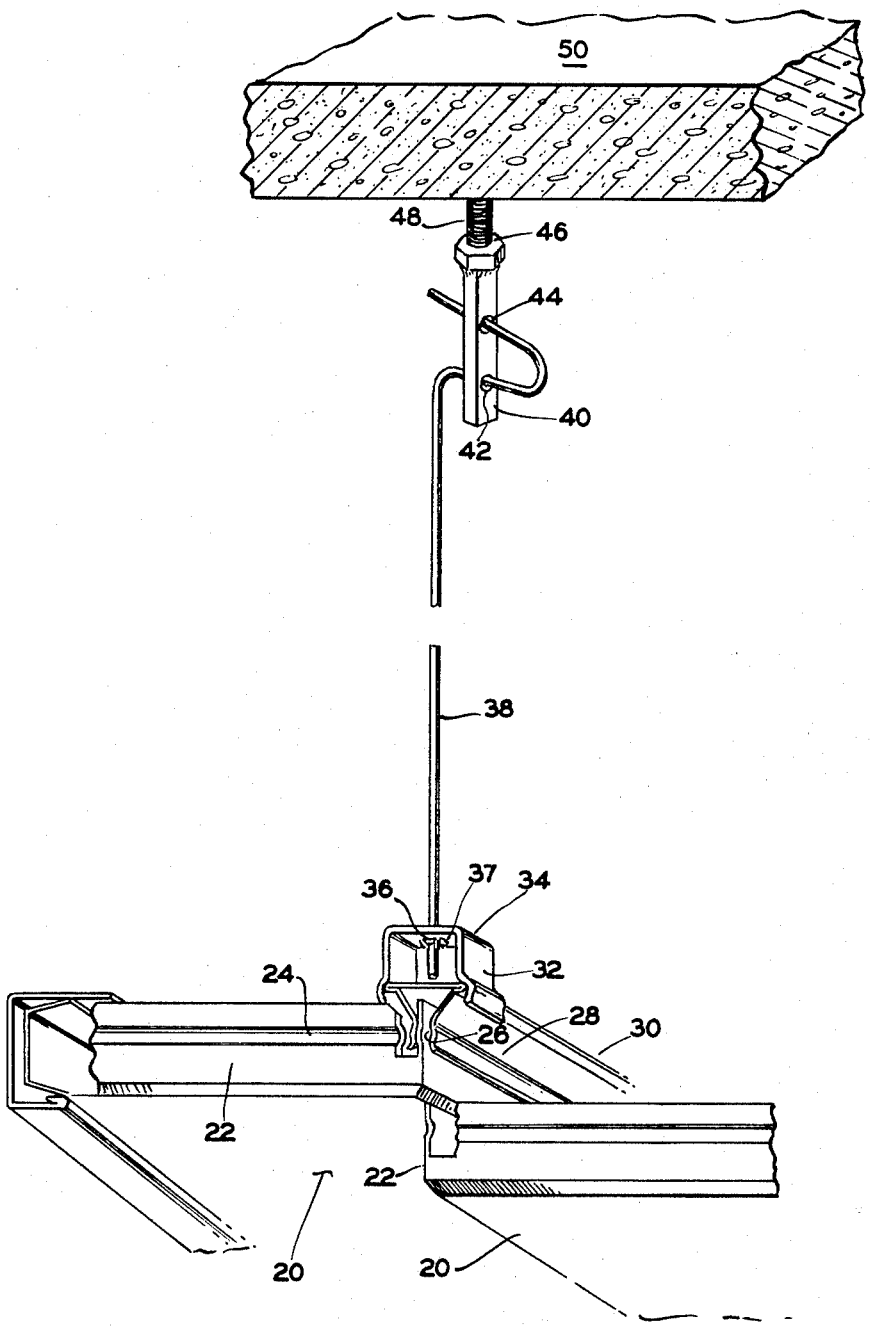
FIGURE 3 is a perspective view of another conventional ceiling construction using the novel suspension wire support means of the present invention.

Referring to FIGURE 3, a ceiling construction is illustrated comprising a plurality of ceiling pans 20, each of which include sidewalls 22. Each sidewall 22 includes a protuberance 24 extending inwardly along its entire length which is adapted to engage a complementary recess 26 formed in a downwardly extending flange 28 of a T bar 30. Each T bar 30 has two downwardly extending flanges 28 which converge with the respective recesses 26 in adjacent opposing relation. The sidewalls 22 of adjacent pans 20 are pressed between flanges 28 and, due to the inherent resiliency of flanges 28, the pans 20 are firmly locked in place. The T bar itself is secured to a U-shaped spring clip 32 having a bight portion 34. Bight portion 34 is centrally apertured at 36 and a suspension wire 38 is extended therethrough. Flanges 37 angularly depend upon the perimeter of aperture 36 and provide a one-way locking arrangement for suspension wire 38.

The suspension wire 38 is secured to a pin 40 having two apertures 42 and 44. The suspension wire is extended through apertures 42 and 44 in the same manner as hereinbefore described in relation to suspension wire 4 extending through apertures 7 and 8 in the embodiment of FIGURE 1. Pin 40 has an internally threaded bore 46 at one end thereof, which is adapted to be secured to the threaded end of a nail 48 embedded in concrete ceiling 50. The suspension wire 38 is secured to pin 40 before the latter is threaded to the nail 48 thereby eliminating any danger of the nail 48 being loosened.

The ceiling structure shown in FIGURE 3 serves to illustrate another important feature of the present invention. It should be noted that pans 20 are pressed into place. In order to accomplish this, and as provided for in the present invention, suspension wire 38 must be locked against pivotal movement. In conventional ceiling structures, suspension wire 38 is secured through only one aperture and thus, it is free to pivot. Such pivotal movement has heretofore prevented the use of suspension wire to suspend pan ceilings of this type.

Since the locking arrangement for the suspension 38 is locked against pivotal movement in accordance with the present invention, the use of relatively inexpensive suspension wire in suspended ceilings is greatly increased.

It is to be understood that the present invention has application to any support member which is adapted to have a wire secured thereto. Various primary support members modified in accordance with the present invention are shown by way of example in FIGURES 4–6.

Referring to FIGURE 4, screws (only one of which is shown at 66) are adapted to be screwed through ceiling 64 into the joists 60. An upper floor or roof structure 62 is secured to joists 60. Screw 66 has two apertures 68 and 70 extending therethrough transverse to its longitudinal axis. Suspension wire 72 is extended through apertures 68 and 70, in the same manner as hereinbefore described, and thereby locked to screw 66.

Referring to FIGURE 5, a toggle bolt 80, modified in accordance with the present invention, is shown as comprising a pin 83 extending through a primary support 82 and secured thereto by conventional toggle arrangement. The structure of the toggle bolt is conventional except as modified by the two apertures 84 and 86 through which suspension wire 88 is adapted to be extended. Spring elements 81 (shown in dotted lines) normally bias arms 85 and 87 of toggle bolt 80 in the outwardly diverging relation shown in FIGURE 5. Arms 85 and 87 are pivoted to pins 89 (one of which is shown) which are threaded to toggle bolt 80. The arms 85 and 87, in a conventional manner, are collapsed and extended through the aperture in support 82 when the toggle bolt is first attached to the support 82.

Referring to FIGURE 6, a concrete ceiling 90 is shown having embedded therein U-shaped channel members 92. The legs 94 of the U-shaped channel member 92 converge toward each other. An apertured disc 96 having a trapezoidal cross section is disposed within U-shaped channel member 92. Threaded through the aperture in disc 96 is a pin 98 causing the side wall of disc 96 to bias against the inner wall of U-shaped channel 92 and thereby lock the pin in place. Pin 98 has two apertures 99 and 100 through which a suspension wire 102 is extended in the manner as hereinbefore described.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A member, said member having a longitudinal axis, said member having a pair of apertures extending therethrough transversely of said longitudinal axis, a second member having a pair of leg portions extending in diverging relationship, each of said leg portions extending through one of said apertures, one of said leg portions being spring biased with the outer surface of said one leg portion resiliently engaging the surface extending about one of said apertures, the other of said leg portions being spring biased with the outer surface of said other leg portion resiliently engaging the surface extending about the other of said apertures, said member comprises a nail having a pointed end portion.

2. A member, said member having a longitudinal axis, said member having a pair of apertures extending therethrough transversely of said longitudinal axis, a second member having a pair of leg portions extending in diverging relationship, each of said leg portions extending through one of said apertures, one of said leg portions being spring biased with the outer surface of said one leg portion resiliently engaging the surface extending about one of said apertures, the other of said leg portions being spring biased with the outer surface of said other leg portion resiliently engaging the surface extending about the other of said apertures, said member has a threaded end portion.

3. A member, said member having a longitudinal axis, said member having a pair of apertures extending therethrough transversely of said longitudinal axis, a second member, said second member having a pair of leg portions extending in diverging relationship, said leg portions being connected by an arcuate bight portion formed by a single bending operation, each of said leg portions extending through one of said apertures, one of said leg portions being spring biased with said one leg portion resiliently engaging the surface extending about one of said apertures, the other of said leg portions being spring biased with said other leg portion resiliently engaging the surface extending about the other of said apertures, said member comprises a nail having a pointed end portion.

4. A member, said member having a longitudinal axis, said member having a pair of apertures extending therethrough transversely of said longitudinal axis, a second member, said second member having a pair of leg portions extending in diverging relationship, said leg portions being connected by an arcuate bight portion formed by a single bending operation, each of said leg portions extending through one of said apertures, one of said leg portions being spring biased with said one leg portion resiliently engaging the surface extending about one of said apertures, the other of said leg portions being spring biased with said other leg portion resiliently engaging the surface extending about the other of said apertures, said member has a threaded end portion.

5. A member as defined by claim 3, a ceiling structure, said second member supporting said ceiling structure.

6. A member, said member having a longitudinal axis, said member having a pair of apertures extending therethrough transverse to said longitudinal axis, at least one of said apertures extending at an acute angle relative to said longitudinal axis, a second member having a pair of leg portions extending in diverging relationship, said leg portions being connected by an arcuate bight portion formed by a single bending operation, each of said leg portions extending through one of said apertures, one of said leg portions being spring biased with said one leg portion resiliently engaging the surface extending about one of said apertures, the other of said leg portions being spring biased with said other leg portion resiliently engaging the surface extending about the other of said apertures, said member comprising a nail having a pointed end portion.

7. A member as defined by claim 6, a ceiling structure, said second member supporting said ceiling structure.

8. A member as defined by claim 7, said nail has a main body portion adjacent said pointed end portion, said main body portion having an end wall extending in a plane substantially perpendicular to said longitudinal axis.

References Cited

UNITED STATES PATENTS

| | | | |
|---|---|---|---|
| 437,470 | 9/1890 | Wright | 24—129 |
| 2,771,259 | 11/1956 | Laystrom | 248—216 X |
| 2,841,255 | 7/1958 | Kemp | 52—489 |
| 3,091,423 | 5/1963 | Butterworth | 248—225 |
| 3,121,978 | 2/1964 | Reiland | 52—716 |
| 3,124,249 | 3/1964 | Flashman | 248—216 |
| 3,286,426 | 11/1966 | Halbostad | 52—484 |
| 3,159,251 | 12/1964 | Becker | 52—484 |

FOREIGN PATENTS

| | | |
|---|---|---|
| 243,123 | 1963 | Australia. |
| 243,921 | 1963 | Australia. |
| 250,558 | 1964 | Australia. |
| 1,353,181 | 1964 | France. |

JOHN E. MURTAGH, *Primary Examiner.*

FRANK L. ABBOTT, *Examiner.*

R. A. STENZEL, G. W. HORNADAY,
*Assistant Examiners.*